Patented Mar. 11, 1924.

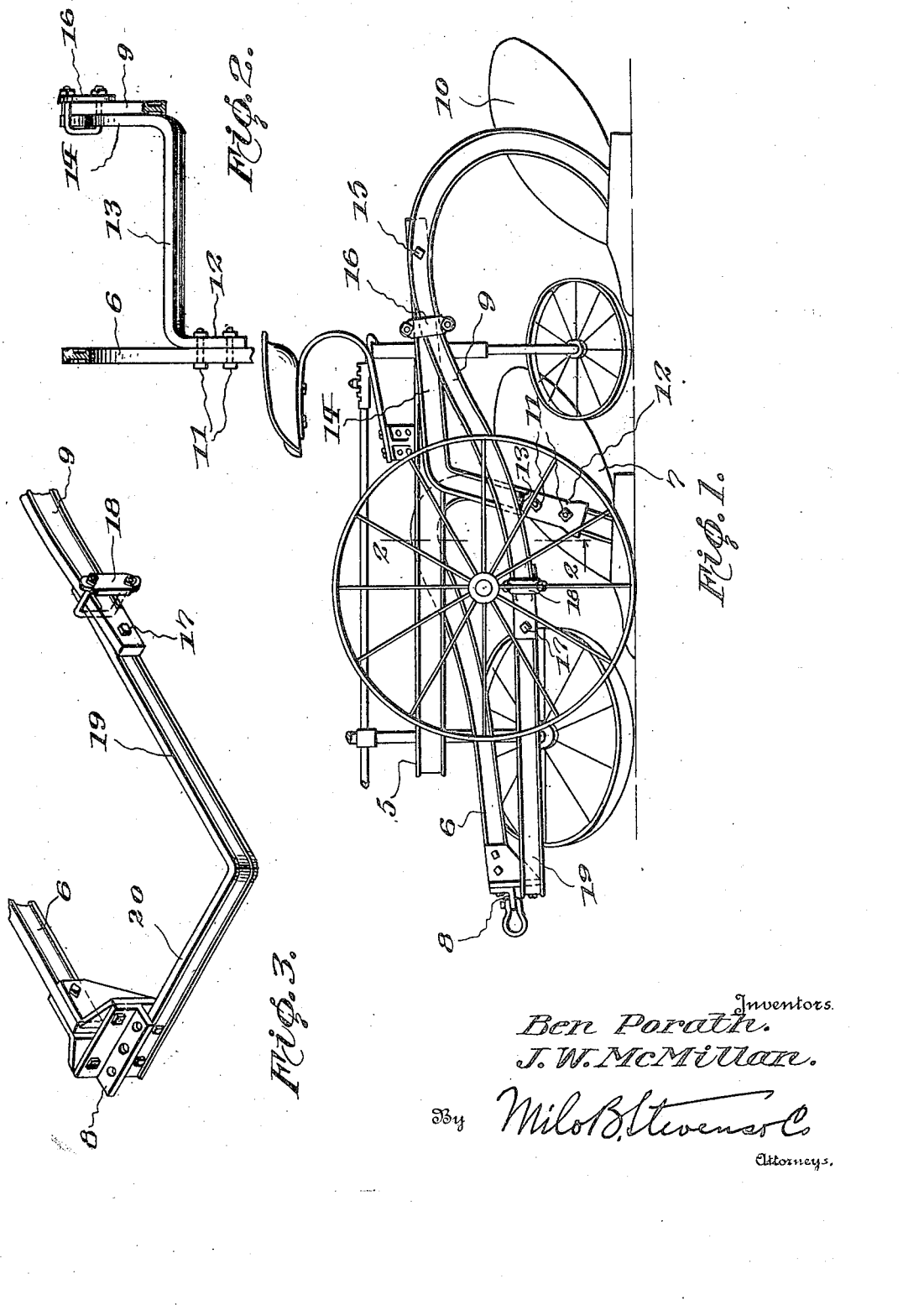

1,486,543

UNITED STATES PATENT OFFICE.

BENJIMAN PORATH AND JAMES W. McMILLAN, OF BUFFALO, WYOMING.

SULKY-PLOW ATTACHMENT.

Application filed January 30, 1923. Serial No. 615,895.

*To all whom it may concern:*

Be it known that we, BENJIMAN PORATH and JAMES W. MCMILLAN, citizens of the United States, residing at Buffalo, in the county of Johnson and State of Wyoming, have invented new and useful Improvements in Sulky-Plow Attachments, of which the following is a specification.

This invention relates to sulky plows, and its object is to change an ordinary plow of this kind into a gang plow by attaching thereto the beam and the share of an ordinary walking plow.

The invention also has for its object to provide an attaching means which permits the two implements to be readily coupled together, and also readily uncoupled so that either implement may be used alone if desired.

With the objects stated in view, the invention consists in a novel combination and arrangement of parts to be hereinafter described and claimed, and in order that the same may be better understood, reference is had to the accompanying drawing, wherein—

Figure 1 is a side elevation showing the two implements coupled up;

Fig. 2 is a sectional view on the line 2—2 of Fig. 1, and

Fig. 3 is a perspective view showing the means for connecting the two beams in front.

Referring specifically to the drawing, 5 denotes the frame of an ordinary sulky plow, the same carrying a beam 6, to the rear downwardly turned end of which latter is attached the share 7. The implement is one of standard design and hence a detailed description thereof is not necessary. The forward end of the beam 6 carries the usual bracket 8 to which the draft devices are connected.

At 9 is shown the beam of an ordinary walking plow having attached to its rear downturned end the share 10.

The means for attaching or coupling the walking plow to the sulky plow consists of the following parts:

To the downturned rear end of the beam 6, is bolted or otherwise secured, as shown at 11, a bracket arm 12, which extends upwardly for a short distance along the beam, and then has a lateral bend 13, after which it is continued rearwardly in a substantially horizontal direction, as shown at 14, to extend alongside the beam 9. By means of a bolt 15 and a U-clamp 16, the beam 9 is secured intermediate its ends to the bracket end 14.

To the forward end of the beam 9 is secured by a bolt 17 and a U-clamp 18, a bracket beam 19 extending forwardly and having at its forward end a lateral bend 20 toward the bracket 8, to which latter it is bolted or otherwise made fast. The bracket beam therefore provides a connection between the forward ends of the plow beams 9 and 6, whereas the rear bracket composed of the parts 12, 13 and 14 provides a connection between the rear ends of the plow beams. The offset 13 and the bend 20 suitably locates the share 10 off to one side of the path taken by the share 7, and the length of the rear portion 14 of the rear bracket is such as to locate the share 10 the proper distance to the rear of the share 7.

The two implements being coupled up as hereinbefore described, a gang plow is had which operates in the same manner as any ordinary gang plow, and as the connection is between the beams 6 and 9, the share 10 is elevated or lowered with the share 7. The means whereby the two implements are coupled together permit the same to be readily uncoupled so that either implement may be used alone.

We claim:

1. An attachment for converting a sulky plow into a gang plow, comprising a beam carrying a share at its rear end, a bracket beam connected to the forward end of said beam and attached to the corresponding end of the sulky plow beam, a bracket connected to the rear end of the sulky plow beam and having a laterally offset rearward extension, and means for attaching the first-mentioned beam intermediate its ends to said extension.

2. An attachment for converting a sulky plow into a gang plow, comprising a beam carrying a share at its rear end, a bracket beam connected to the forward end of said beam and having a forward lateral extension, means for securing said extension to the forward end of the sulky plow beam, a bracket connected to the rear end of the sulky plow beam and having a laterally offset rearward extension, and means for attaching the first-mentioned beam intermediate its ends to said extension.

In testimony whereof we affix our signatures.

BENJIMAN PORATH.
JAMES W. McMILLAN.